US012641636B2

(12) United States Patent
Han et al.

(10) Patent No.: US 12,641,636 B2
(45) Date of Patent: May 26, 2026

(54) RESOURCE ALLOCATION METHOD, DEVICE, AND MEDIUM

(71) Applicant: DATANG MOBILE COMMUNICATIONS EQUIPMENT CO., LTD., Beijing (CN)

(72) Inventors: Bo Han, Beijing (CN); Deshan Miao, Beijing (CN); Shaoli Kang, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 305 days.

(21) Appl. No.: 18/552,890

(22) PCT Filed: Mar. 24, 2022

(86) PCT No.: PCT/CN2022/082822
§ 371 (c)(1),
(2) Date: Sep. 27, 2023

(87) PCT Pub. No.: WO2022/206559
PCT Pub. Date: Oct. 6, 2022

(65) Prior Publication Data
US 2024/0172274 A1 May 23, 2024

(30) Foreign Application Priority Data
Apr. 1, 2021 (CN) .......................... 202110357731.1

(51) Int. Cl.
*H04W 74/00* (2009.01)
*H04W 74/0833* (2024.01)
(52) U.S. Cl.
CPC ..... *H04W 74/002* (2013.01); *H04W 74/0833* (2013.01)

(58) Field of Classification Search
CPC .................................................. H04W 74/002
See application file for complete search history.

(56) References Cited

U.S. PATENT DOCUMENTS

2016/0277155 A1 9/2016 Nissilä
2019/0075602 A1 3/2019 Lin et al.
(Continued)

FOREIGN PATENT DOCUMENTS

CN 108901076 A 11/2018
CN 110475371 A 11/2019
(Continued)

OTHER PUBLICATIONS

Notice of Allowance of Corresponding CN Patent Application No. 202110357731.1 Dated Jun. 4, 2025.
(Continued)

*Primary Examiner* — Pamit Kaur
(74) *Attorney, Agent, or Firm* — KILPATRICK TOWNSEND & STOCKTON LLP

(57) ABSTRACT

Disclosed in embodiments of the present application are a resource allocation method, a device, and a medium. The method comprises: a terminal device determines N NPRACH transmission resources corresponding to a sending period of an ephemeris-bearing SIB bearing according to said sending period as well as configuration information for an NPRACH transmission resource indicated in an SIB2, where N is a natural number greater than zero; the terminal device randomly selects one NPRACH transmission resource from among the N NPRACH transmission resources; and the terminal device performs random access on a network device by means of the selected NPRACH transmission resource.

19 Claims, 4 Drawing Sheets

Terminal device

Network device

S300, the terminal device determines N NPRACH transmission resources corresponding to a transmitting period of an SIB carrying an ephemeris according to the transmitting period of the SIB carrying the ephemeris and configuration information of NPRACH transmission resources notified in an SIB2, wherein N is a natural number greater than 0

S301, the terminal device randomly selects one NPRACH transmission resource from the N NPRACH transmission resources S302, the terminal device performs the random access to the network device through the selected NPRACH transmission resource

(56) References Cited

U.S. PATENT DOCUMENTS

| | | | |
|---|---|---|---|
| 2019/0281405 A1 | 9/2019 | Chae | |
| 2021/0195646 A1* | 6/2021 | Gao | H04B 17/327 |
| 2023/0345396 A1* | 10/2023 | Niu | H04W 56/0045 |

FOREIGN PATENT DOCUMENTS

| | | | |
|---|---|---|---|
| CN | 110621079 A | 12/2019 | |
| CN | 111182630 A | 5/2020 | |
| CN | 111565459 A | 8/2020 | |
| CN | 111726744 A | 9/2020 | |
| WO | 2017160221 A1 | 9/2017 | |
| WO | 2017212443 A1 | 12/2017 | |
| WO | 2020094080 A1 | 5/2020 | |

OTHER PUBLICATIONS

ZTE, "Discussion on power consumption and NPRACH capacity for NTN", 3GPP TSG RAN WG1 #103-e, R1-2008856, e-Meeting, Oct. 26-Nov. 13, 2020.
European Patent Office, Extended European Search Report Issued in Application No. 22778742.1, Sep. 5, 2024, Germany, 58 pages.
Moderator (MediaTek),"Summary #1 of AI 8.15.2 Enhancements to time and frequency synchronization", 3GPP TSG RAN WG1 Meeting #104e, Jan. 25-Feb. 5, 2021, total 22 pages, R1-2101803.
The office action and search report issued in counterpart Chinese application 202110357731.1, mailed on Dec. 30, 2024.

* cited by examiner

RESOURCE ALLOCATION METHOD, DEVICE, AND MEDIUM

CROSS-REFERENCE TO RELATED APPLICATIONS

The present disclosure is a US National Stage of International Application No. PCT/CN2022/082822. filed Mar. 24, 2022. which claims priority to Chinese patent application No. 202110357731.1 filed on Apr. 1, 2021 to China National Intellectual Property Administration, and entitled "RESOURCE ALLOCATION METHOD, DEVICE AND SYSTEM", the entire contents of which are incorporated herein by reference.

FIELD

The present disclosure relates to the field of wireless communication technologies, and in particular, to a resource allocation method, device and medium.

BACKGROUND

At present, in an application process of a narrowband internet of things (NB-IOT)/an enhanced machine-type communications (eMTC) of long term evolution (LTE), When there is uplink data arriving at an IoT non-terrestrial network (NTN) user equipment (UE), the UE is waked up and performs a global navigation satellite system (GNSS) measurement to complete downlink synchronization. NB-IOT obtains a narrowband physical random access channel (NPRACH) resource(s) by reading a system information block 2 (SIB2), and then reads the SIBx carrying ephemeris information, and sends a random access preamble signal on the corresponding NPRACH resource(s) according to a coverage level.

SUMMARY

Embodiments of the present disclosure provide a resource allocation method, device, and medium, so as to provide a resource allocation method which is efficient, flexible, and of a high success rate.

In a first aspect, a resource allocation method provided by the embodiments of the present disclosure includes:

determining, by a terminal device, N NPRACH transmission resources corresponding to a transmitting period of an SIB carrying an ephemeris according to the transmitting period of the SIB carrying the ephemeris and configuration information of NPRACH transmission resources notified in an SIB2, where N is a natural number greater than 0; randomly selecting, by the terminal device, one NPRACH transmission resource from the N NPRACH transmission resources; and performing, by the terminal device, a random access to a network device through the selected NPRACH transmission resource.

In the above method, the terminal can randomly select one of multiple available transmission resources for the random access, so that when terminals performs random accesses, the terminals can be distributed to different transmission resources to reduce the probability of conflict, so as to effectively avoid a problem of random access failure caused by the transmission resource conflict since the terminals concentrate on the same transmission resource to initiate random accesses.

In a possible implementation, the terminal device obtains the transmitting period of the SIB carrying ephemeris from a master information block (MIB); or the terminal device obtains the transmitting period of the SIB carrying ephemeris from an SIB1.

In a possible implementation, the terminal device determines the N NPRACH transmission resources in the transmitting period of the SIB carrying the ephemeris according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, a formula for the terminal device determining N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \left\lfloor \left(N_{period}^{SIBx} - T_{SIBx}\right)/N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the determining, by the terminal device, the N NPRACH transmission resources corresponding to the transmitting period of the SIB carrying the ephemeris according to the transmitting period of the SIB carrying the ephemeris and the configuration information of NPRACH transmission resources notified in the SIB2, including: determining, by the terminal device, the N NPRACH transmission resources in the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} =$$
$$\lfloor \left(N_{period}^{SIBx} - T_{SIBx} - \left(n_f * 10 - (n_f * 10) \bmod N_{period}^{NPRACH}\right)\right)/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In a possible implementation, a formula for the terminal device randomly selecting one NPRACH transmission resource from the N NPRACH transmission resources is:

$$n_f^{NPRACH} = n_f + rand\left(0, \dots N_{num}^{NPRACH} - 1\right) * N_{period}^{PRACH}/10;$$

where, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the randomly selecting, by the terminal device, one NPRACH transmission resource from the N NPRACH transmission resources, including: randomly selecting, by the terminal device, one NPRACH transmission resource from M NPRACH transmission resources; where the M is a natural number greater than 0, and is less than or equal to N.

In a possible implementation, the M is configured by the network device and notified to the terminal device.

In a possible implementation, the M is configured by the network device and notified to the terminal device through the SIB2.

In a possible implementation, a formula for the terminal device randomly selecting one NPRACH transmission resource from the M NPRACH transmission resources is:

$$N_f^{NPRACH} = n_f + rand\left(0, \dots N_{num}^{RO} - 1\right) * N_{period}^{PRACH}/10;$$
$$N_{num}^{RO} \le N_{num}^{NPRACH};$$

where, $$N_{num}^{RO}$$

represents NPRACH transmission resources indicated by the network device, and a value of which is 0, . . .

$$N_{num}^{NPRACH} - 1,$$

represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the performing, by the terminal device, the random access to the network device through the selected NPRACH transmission resource, including: performing, by the terminal device, the random access to the network device at a start time of the selected NPRACH transmission resource.

In a second aspect, a resource allocation method provided by the embodiments of the present disclosure includes:
determining, by a terminal device, according to a preset delay time and a first NPRACH transmission resource, a second NPRACH; and performing, by the terminal device, a random access to a network device through the second NPRACH transmission resource.

In the above method, after the terminal has determined the first transmission resource for the random access through the prior art, the terminal may re-determine the second transmission resource according to a delay time preset by itself, and perform the random access through the second transmission resource. Because the preset delay times of the respective terminal devices may be different, the probability of conflict between the transmission resources that are actually used to perform the random access obtained by the terminal based on the delay time preset by itself and normally determined transmission resources can be effectively reduced, so as to effectively avoid a problem of random access failure caused by the transmission resource conflict since the terminals concentrate on the same transmission resource to initiate random accesses.

In a possible implementation, the second NPRACH transmission resource is one of N NPRACH transmission resources corresponding to a transmitting period of an SIB carrying an ephemeris and determined by the terminal device according to the transmitting period of the SIB carrying the ephemeris and configuration information of NPRACH transmission resources notified in an SIB2, where N is a natural number greater than 0.

In a possible implementation, determining, by the terminal device, N NPRACH transmission resources corresponding to the transmitting period of the SIB carrying the ephemeris according to the transmitting period of the SIB carrying the ephemeris and the configuration information of NPRACH transmission resources notified in the SIB2, including determining, by the terminal device, the N NPRACH transmission resources in the transmitting period of the SIB carrying the ephemeris according to the transmitting period of the SIB carrying the ephemeris, a first processing time, and a configuration period of the NPRACH transmission resources;

where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \left\lfloor \left( N_{period}^{SIBx} - T_{SIBx} \right) / N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, in a condition that a time duration corresponding to a radio frame on which the terminal device is located is not divisible, the determining, by the terminal device, N NPRACH transmission resources corresponding to the transmitting period of the SIB carrying the ephemeris according to the transmitting period of the SIB carrying the ephemeris and the configuration information of NPRACH transmission resources notified in the SIB2, including: determining, by the terminal device, the N NPRACH transmission resources in the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \left\lfloor N_{period}^{SIBx} - T_{SIBx} - \left( n_f * 10 - (n_f * 10) \bmod N_{period}^{NPRACH} \right) \right\rfloor / N_{period}^{NPRACH};$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In a third aspect, an embodiment of the present disclosure provides a resource allocation device, including: a processor, a memory, and a transceiver:

where the processor is configured to read programs in the memory to:

determine N NPRACH transmission resources corresponding to a transmitting period of an SIB carrying an ephemeris according to the transmitting period of the SIB carrying the ephemeris and configuration information of NPRACH transmission resources notified in an SIB2, where N is a natural number greater than 0; randomly select one NPRACH transmission resource from the N NPRACH transmission resources; and perform a random access to a network device through the selected NPRACH transmission resource.

In a possible implementation, the N NPRACH transmission resources in the transmitting period of the SIB carrying the ephemeris is determined according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx}) / N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processor is configured to:

determine the N NPRACH transmission resources in the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} = \lfloor N_{period}^{SIBx} - T_{SIBx} - (n_f * 10 - (n_f * 10) \bmod N_{period}^{NPRACH})) / N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In a possible implementation, one NPRACH transmission resource is randomly selected from the N NPRACH transmission resources by the following formula:

$$n_f^{NPRACH} = n_f + rand(0, \dots N_{num}^{NPRACH} - 1) * N_{period}^{PRACH} / 10;$$

where, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the processor is configured to:

randomly select one NPRACH transmission resource from M NPRACH transmission resources; where the M is a natural number greater than 0, and is less than or equal to N.

In a possible implementation, the M is configured by the network device and notified to the terminal device.

In a possible implementation, the M is configured by the network device and notified to the terminal device through the SIB2.

In a possible implementation, one NPRACH transmission resource is randomly selected from the M NPRACH transmission resources by the following formula:

$$n_f^{NPRACH} = n_f + rand(0, \ldots N_{num}^{RO} - 1) * N_{period}^{NPRACH} / 10;$$

$$N_{num}^{RO} \leq N_{num}^{NPRACH};$$

where $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the processor is configured to:

perform the random access to the network device at a start time of the selected NPRACH transmission resource.

In a fourth aspect, the embodiments of the present disclosure provide a resource allocation device, including: a processor, a memory, and a transceiver:

where the processor is configured to read the program in the memory to:

determine, according to a preset delay time and a first NPRACH transmission resource, a second NPRACH transmission resource; and perform a random access to a network device through the second NPRACH transmission resource.

In a possible implementation, the second NPRACH transmission resource is one of N NPRACH transmission resources corresponding to a transmitting period of an SIB carrying an ephemeris and determined by a terminal device according to the transmitting period of the SIB carrying the ephemeris and configuration information of NPRACH transmission resources notified in an SIB2, where N is a natural number greater than 0.

In a possible implementation, the processor is configured to:

determine the N NPRACH transmission resources in the transmitting period of the SIB carrying the ephemeris according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx}) / N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processor is configured to:

determine the N NPRACH transmission resources in the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} =$$
$$\lfloor (N_{period}^{SIBx} - T_{SIBx} - (n_f * 10 - (n_f * 10) \bmod N_{period}^{NPRACH})) / N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f{*}10$ represents a time duration corresponding to the radio frame of $n_f$, and $$N_{period}^{NPRACH}$$

represents the configuration period of the NPRACH transmission resources.

In a fifth aspect, an embodiment of the present disclosure further provides a resource allocation device, including:

at least one processing device and at least one storage device, where the storage device stores program codes, when the program codes are executed by the processing device, the processing device is caused to execute a function of each embodiment of any one of methods in the first aspect and the second aspect.

In a sixth aspect, an embodiment of the present disclosure further provides a resource allocation device, the device including:

a processing device, configured to determine N NPRACH transmission resources corresponding to a transmitting period of an SIB carrying an ephemeris according to the transmitting period of the SIB carrying the ephemeris and configuration information of NPRACH transmission resources notified in an SIB2, where N is a natural number greater than 0; and randomly select one NPRACH transmission resource from the N NPRACH transmission resources; and a communication device, configured to perform a random access to a network device through the selected NPRACH transmission resource.

In a possible implementation, the processing device is configured to:

determine the N NPRACH transmission resources corresponding to the transmitting period of the SIB carrying the ephemeris according to the transmitting period of the SIB carrying the ephemeris, a first processing time, and a configuration period of the NPRACH transmission resources;

where the first processing time is a period of time for a terminal device to read and/or decode and parse the SIB carrying the ephemeris.

In a possible implementation, in a condition that a radio frame on which the terminal device is located is an integer multiple of the configuration period of the NPRACH transmission resources, the processing device is configured to determine the N NPRACH transmission resources corresponding to the transmitting period of the SIB carrying the ephemeris according to the transmitting period of the SIB carrying the ephemeris and the configuration information of NPRACH transmission resources notified in the SIB2 through the following formula:

$$N_{num}^{NPRACH} = \left\lfloor \left( N_{period}^{SIBx} - T_{SIBx} \right) / N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processing device is configured to:

determine the N NPRACH transmission resources corresponding to the transmitting period of the SIB carrying the ephemeris according to the transmitting period of the SIB carrying the ephemeris, a first processing time, a configuration period of NPRACH transmission resources, and a radio frame;

where the first processing time is a period of time for a terminal device to read and/or decode and parse the SIB carrying the ephemeris.

In a possible implementation, in a condition that the radio frame on which the terminal device is located is not an integer multiple of the configuration period of the NPRACH transmission resource, the processing device is configured to determine the N NPRACH transmission resources corresponding to the transmitting period of the SIB carrying the ephemeris according to the transmitting period of the SIB carrying the ephemeris and the configuration information of NPRACH transmission resources notified in the SIB2 by the following formula:

$$N_{num}^{NPRACH} =$$
$$\left\lfloor \left( N_{period}^{SIBx} - T_{SIBx} - \left( n_f * 10 - (n_f * 10) \bmod N_{period}^{NPRACH} \right) \right) / N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f{*}10$ represents a time duration corresponding to the radio frame of $n_f$, and $$N_{period}^{NPRACH}$$

represents the configuration period of the NPRACH transmission resources.

In a possible implementation, the processing device is configured to randomly select one NPRACH transmission resource from the N NPRACH transmission resources by the following formula:

$$n_f^{NPRACH} = n_f + rand(0, \ldots \ N_{num}^{NPRACH} - 1) * N_{period}^{NPRACH} / 10;$$

where,

5

$$N_{num}^{NPRACH}$$

represents the quantity N of NPRACH transmission resources, $n_f$ represents a sequence number of a radio frame, $$N_{period}^{NPRACH}$$

15 represents the configuration period of the NPRACH transmission resources, and

20

$$n_f^{NPRACH}$$

represents the randomly selected NPRACH transmission resource.

In a possible implementation, the processing device is configured to:

randomly select one NPRACH transmission resource from M NPRACH transmission resources; where the M is a natural number greater than 0, and is less than or equal to N.

In a possible implementation, the M is configured by the network device and notified to the processing device.

In a possible implementation, the M is configured by the network device and notified to the processing device through the SIB2.

In a possible implementation, the processing device is configured to randomly select one NPRACH transmission resource from the M NPRACH transmission resources by a following formula:

$$n_f^{NPRACH} = n_f + rand(0, \ldots \ N_{num}^{RO} - 1) * N_{period}^{PRACH} / 10;$$

$$N_{num}^{RO} \leq N_{num}^{NPRACH};$$

where $$N_{num}^{RO}$$

represents NPRACH transmission resources indicated by the network device, and a value of which is 0, . . .

$$N_{num}^{NPRACH} - 1,$$

represents a sequence number of a radio frame, $$N_{period}^{NPRACH}$$

65

--- represents the configuration period of the NPRACH transmission resources, and $$n_f^{NPRACH}$$

represents the randomly selected NPRACH transmission resource.

In a possible implementation, the communication device is configured to:

perform the random access to the network device at a start time of the selected NPRACH transmission resource.

In a seventh aspect, an embodiment of the present disclosure further provides a resource allocation device, including:

a processing device, configured to determine, according to a preset delay time and a first NPRACH transmission resource, a second NPRACH transmission resource; and a communication device, configured to perform a random access to a network device through the second NPRACH transmission resource.

In a possible implementation, the second NPRACH transmission resource is one of N NPRACH transmission resources corresponding to a transmitting period of an SIB carrying an ephemeris and determined by a terminal device according to the transmitting period of the SIB carrying the ephemeris and configuration information of NPRACH transmission resources notified in an SIB2, where N is a natural number greater than 0.

In a possible implementation, the processing device is configured to:

determine the N NPRACH transmission resources in the transmitting period of the SIB carrying the ephemeris according to the transmitting period of the SIB carrying the ephemeris, a first processing time, and a configuration period of the NPRACH transmission resources;

where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the processing device is configured to determine N NPRACH transmission resources corresponding to the transmitting period of the SIB carrying the ephemeris according to the transmitting period of the SIB carrying the ephemeris and the configuration information of NPRACH transmission resources notified in the SIB2 by the following formula:

$$N_{num}^{NPRACH} = \lfloor (N_{period}^{SIBx} - T_{SIBx}) / N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, in a condition that a time duration corresponding to a radio frame on which the terminal device is located is not divisible, the processing device is configured to:

determine the N NPRACH transmission resources corresponding to the transmitting period of the SIB carrying the ephemeris according to the transmitting period of the SIB carrying the ephemeris, a first processing time, a configuration period of NPRACH transmission resources, and a radio frame;

where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the processing device is configured to determine the N NPRACH transmission resources corresponding to the transmitting period of the SIB carrying the ephemeris according to the transmitting period of the SIB carrying the ephemeris and the configuration information of NPRACH transmission resources notified in the SIB2 by the following formula:

$$N_{num}^{NPRACH} = \left\lfloor \left( N_{period}^{SIBx} - T_{SIBx} - \left( n_f * 10 - (n_f * 10) \bmod N_{period}^{NPRACH} \right) \right) / N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In an eighth aspect, the embodiments of the present disclosure provide a chip system, including a processor, and optionally a memory; where, the memory is configured to store a computer program, and the processor is used to call and run the computer program from the memory, so that the communication device installed with the chip system performs any method in any possible implementation of the first aspect to the second aspect.

In a ninth aspect, the present disclosure further provides a computer storage medium on which a computer program is stored, and when the program is executed by a processor, the steps of any one of the methods in the first aspect or the second aspect are implemented.

In a tenth aspect, an embodiment of the present disclosure provides a computer program product, including: computer program codes, when the computer program codes are run by a communication device, a processing device or a transceiver, or a processor of the resource allocation device, the computer program codes enable the communication device performs the steps of any one of the methods of the first aspect or the second aspect above.

BRIEF DESCRIPTION OF FIGURES

In order to illustrate the embodiments of the present disclosure more clearly, the drawings used in the description of the embodiments is briefly introduced as below.

DETAILED DESCRIPTION

At present, in the application process of NB-IOT/eMTC, when there is uplink data arriving at an IoT NTN UE, the UE is waked up and performs a GNSS measurement to complete downlink synchronization. NB-IOT obtains a NPRACH resource(s) by reading system information in the SIB2, and then reads the SIBx carrying ephemeris information, and sends a preamble signal on the corresponding NPRACH resource(s) according to a coverage level.

In some embodiments, at present, a start time point of a NPRACH transmission needs to be a time point of $$N_{start}^{NPRACH}$$

ms after a start point of a radio frame that meets $$n_f \bmod \left( \frac{N_{period}^{NPRACH}}{10} \right) = 0,$$

a terminal reads the SIBx carrying the ephemeris information, obtains configuration information of the NPRACH resource(s), and determines the NPRACH resource(s) used for sending the preamble signal. Then, a timing advance (TA) for the NPRACH transmission is calculated, and at a time point of $$N_{start}^{NPRACH}$$

ms after the start point of the radio frame that meets $$n_f \bmod \left( \frac{N_{period}^{NPRACH}}{10} \right) = 0,$$

the preamble signal is transmitted according to a specified number of repetitions by using the NPRACH resource(s). The radio frame also known as system frame.

Figure 1:
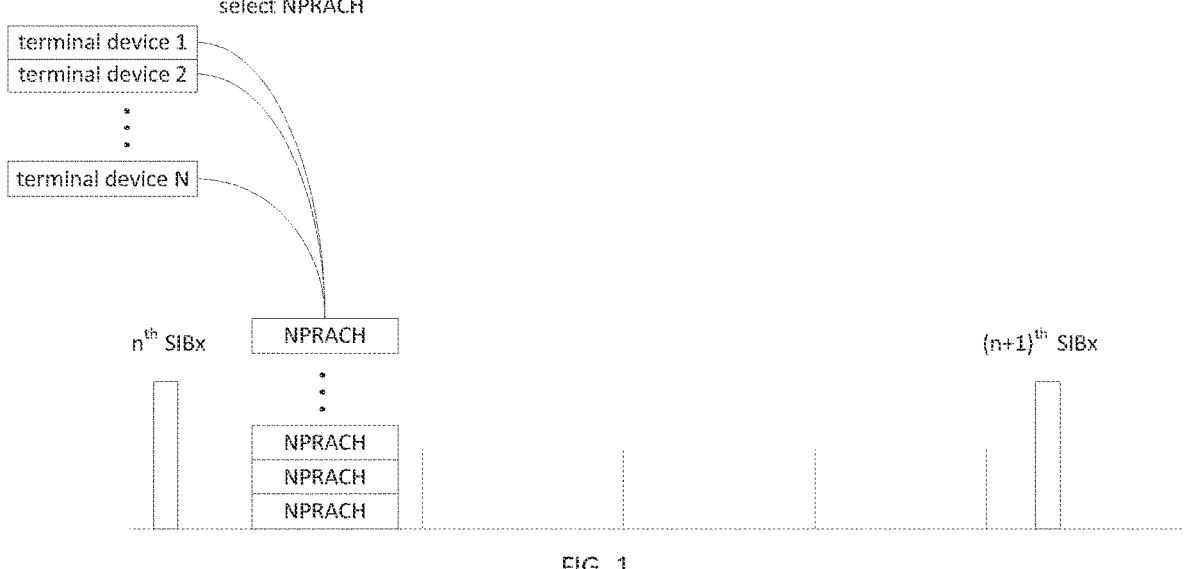
FIG. 1 is a schematic diagram of existing resource allocation.

However, because the IOT NTN UE needs to read the SIBx before transmitting the preamble signal, and send the preamble signal on the subframe(s) that meets the NPRACH transmitting period and the subframe offset condition, as shown in FIG. 1, it often leads to a large number of IoT NTN UEs access at the same time duration, resulting in NPRACH congestion, a random access process failure or excessive access time.

To sum up, in the currently provided method for resource allocation in the random access process, the random access time is excessive and the failure rate is high.

In order to solve the above problem, the embodiments of the present disclosure provide a resource allocation method, and the embodiments of the present disclosure can be applied to various communication systems, for example, applied to the communication systems provided by the embodiments of the present disclosure, or can be applied to the existing global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), an universal mobile telecommunication system (UMTS), a worldwide interoperability for microwave access (WIMAX) communication system, a 5$^{th}$ generation (5G) system or new radio (NR), or, applied to future communication systems or other similar communication systems, etc.

Take the 5G system (also known as the new radio system) as an example. Specifically, new communication scenarios are defined in the 5G system: an ultra-reliable and low-latency communication (URLLC), an enhanced mobile broadband (eMBB) and a massive machine type communication (mMTC). These communication scenarios have stricter requirements on the timeliness and success rate of communication information transmission. Especially in the scenario of massive machine connection communication, facing a large number of UEs accessing at the same time duration, there are stricter requirements on how to avoid NPRACH congestion and improve the success rate of the random access process. Therefore, it is more important to provide a resource allocation method which is efficient, flexible and of a high success rate.

In order to better ensure the success rate of random access and effectively shorten the random access time, the embodiments of the present disclosure propose a resource allocation method for the random access process. Since multiple available NPRACH occasions are incorporated in the method, the terminal may randomly select one from the multiple available NPRACH occasions to be used for transmitting the preamble signal, so that at least one terminal can be distributed to different NPRACH transmitting occasions when performing the random access and the probability of collision is reduced, and therefore the problem of random access failure due to NPRACH transmitting collisions caused by the terminals concentrate on the same NPRACH transmission resource to initiate random accesses can be effectively avoided.

Figure 2:
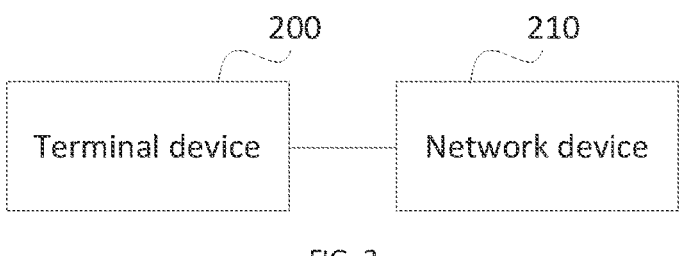
FIG. 2 is a schematic diagram of a resource allocation system provided by an embodiment of the present disclosure.

To facilitate understanding of the embodiments of the present disclosure, firstly, a communication system applicable to the embodiments of the present disclosure is described in detail by taking a communication system shown in FIG. 2 as an example.

As shown in FIG. 2, the communication system includes at least one terminal device 200 and a network device 210.

The terminal device 200 is a device that provides an audio, video and/or data connectivity to users, and may also be referred to as a user equipment, an access terminal, a user device, a user station, a mobile station, a mobile site, a remote station, a remote terminal, a mobile equipment, a user terminal, a terminal, a wireless communication device, a user agent or a user apparatus. The terminal in the embodiments of the present disclosure may be an IoT NTN UE or the like.

The network device 210 is a device that provides a wireless communication function for the terminal device 200 in the communication system, and may access the terminal device 200 to the wireless network. The network device 210 may also be referred to as a base station (BS).

Currently, examples of some network devices 200 are: a next-generation base station (g nodeB, gNB), an evolved node B (eNB), a radio network controller (RNC), a node B (NB), a base station controller (BSC), a base transceiver station (BTS), a home base station (for example, a home evolved nodeB, or home node B, HNB), a baseband unit (BBU),a transmitting and receiving point (TRP), a transmitting point (TP), or a mobile switching center, etc.

It should be noted that, when the resource allocation method in the embodiments of the present disclosure is performed, a performing subject may be the above-mentioned device, a chip in the above-mentioned device, or a functional device in the above-mentioned device, which is not limited in the embodiments of the present disclosure. It should be understood that the above-mentioned network architecture applied to the present disclosure is only an example of the network architecture described from the perspective of service-oriented architecture, the network architecture applicable to the embodiments of the present disclosure is not limited herein, and any network architecture that can implement the functions of the above-mentioned network elements is applicable to the embodiments of the present disclosure.

The network architecture and service scenarios in the embodiments of the present disclosure are for the purpose of illustrating the embodiments of the present disclosure more clearly, and do not constitute a limitation on the embodiments provided by the embodiments of the present disclosure. With the evolution of the architecture and the emergence of new business scenarios, the embodiments provided in the embodiments of the present disclosure are also applicable to similar problems.

The above-mentioned FIG. 2 is only a simplified schematic diagram for easy understanding, and the network architecture may also include other devices (network elements), which are not shown in FIG. 2. For example, in an optional manner of the embodiment of the present disclosure, the communication system may further include a core network device and the like.

Part of terms involved in the embodiments of the present disclosure will be explained as below to facilitate understanding.

(1) Ephemeris refers to a precise position or trajectory table of celestial bodies that change with time in measurements such as a global positioning system (GPS) measurement, GNSS measurement, etc., and is a function of time.

A satellite ephemeris, also known as the two-line orbital element (TLE), is used to describe an expression of a position and velocity of a flight body in the space.

(2) Internet of Things (IOT), i.e., "Internet of Everything Connected", is a network extended and expanded based on the Internet, and is a huge network formed by combining various information sensing devices with the network, and realizes the interconnection and intercommunication of people, machines and things at any time and any place.

(3) System information block (SIB) mainly refers to system information broadcast by a base station, and is divided into various types, which may be transmitted with different frequencies.

For example, the SIB1 mainly includes relevant parameters of the UE evaluating whether it can access the current cell and relevant parameters scheduling by the system. The SIB2 mainly includes public radio resource configuration information, timers and constants, and cell access prohibition information. The SIB3 mainly includes cell reselection related information and intra-frequency cell reselection related information. The SIB4 mainly includes intra-frequency neighbor cell related information. The SIB5 mainly includes inter-frequency neighbor cell related information.

The SIBx in the embodiments of the present disclosure is mainly used to carry ephemeris information.

In an optional manner of the embodiments of the present disclosure, the SIB carrying the ephemeris may be an extension or content update for the content included in the above-mentioned existing SIB, for example, the SIBx carrying the ephemeris information may be carried in SIB1, or may also be a newly developed SIB.

In addition, when the embodiments of the present disclosure are applied to the random access of the satellite Internet of Things, the SIB carrying the ephemeris carries the system information of the ephemeris. While the ephemeris information carried in the SIB carrying the ephemeris is transmitted, the SIB carrying the ephemeris also carries the timestamp information representing at which the ephemeris information is transmitted.

(4) Narrowband Internet of Things (NB-IOT), which is an important branch of the internet of everything connected, is also known as a low-power wide-area network (LPWAN). The NB-IoT is constituted on a cellular network, only consumes a bandwidth about 180 kHz, and may be directly deployed in a GSM network, UMTS network or LTE network to reduce deployment costs and achieve smooth upgrades. The cellular data connections of low-power devices in the wide-area network are supported, and the efficient connections of devices with long standby time and high network connection requirements are supported.

(5) Reference signal receiving power (RSRP) is one of key parameters that may represent the wireless signal strength and one of the physical layer measurement requirements in the LTE network, and is an average value of power of signals received on all resource elements (RE) carrying the reference signal within a certain symbol.

Where, the term "at least one" in the embodiments of the present disclosure refers to one or more, and "multiple" refers to two or more. "And/or", which describes the associated relationship of the associated objects, means that there can be three kinds of relationships, for example, A and/or B, which can mean that A exists alone, A and B exist at the same time, and B exists alone, where A, B can be singular or plural. The character "/" generally indicates that the associated objects before and after "/"are an "or" relationship. The at least one item (at least one) of the following or similar expressions refer to any combination of these items, including any combination of single item or plural items (single or plural numbers). For example, at least one item (at least one) of a, b, or c can represent: a, b, c, a-b, a-c, b-c, or a-b-c, where a, b, c may be single or multiple.

Unless stated to the contrary, ordinal numbers such as "first" and "second" mentioned in the embodiments of the present disclosure are used to distinguish multiple objects, and are not used to limit the order, sequence, priority, or importance of multiple objects.

In addition, the terms "including" and "having" in the embodiments, claims and drawings of the present disclosure are not exclusive. For example, a process, method, system, product or device that includes a series of steps or devices is not limited to the listed steps or devices, and may also include unlisted steps or devices.

Figure 3:
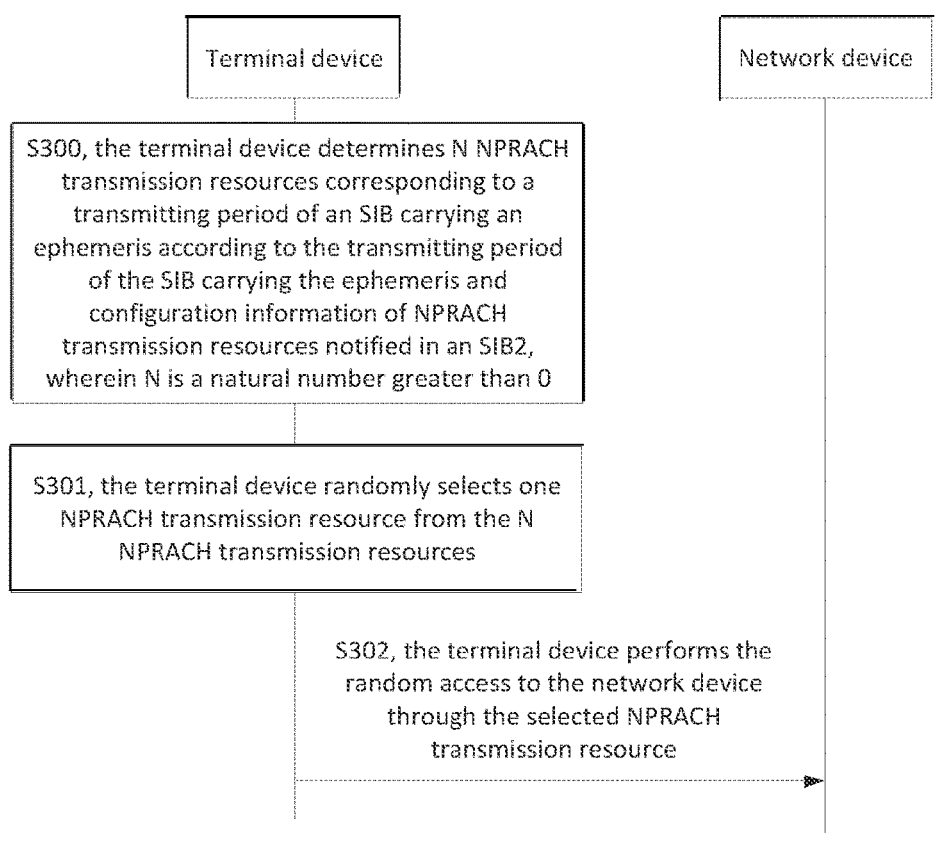
FIG. 3 is a schematic flowchart of a first resource allocation method provided by an embodiment of the present disclosure.

Further, as shown in FIG. 3, the embodiments of the present disclosure provide a resource allocation method, which includes the following.

S300, the terminal device determines N NPRACH transmission resources corresponding to a transmitting period of an SIB carrying an ephemeris according to the transmitting period of the SIB carrying the ephemeris and configuration information of NPRACH transmission resources notified in an SIB2, where N is a natural number greater than 0.

It should be noted that the embodiments of the present disclosure does not specifically limit the SIB carrying the ephemeris, that is, the SIB carrying the ephemeris may be SIB1 or other system information blocks, for example, a newly set SIB.

In the embodiments of the present disclosure, when determining the transmitting period of the SIB carrying the ephemeris, there may be different determination manners according to different situations of the SIB carrying the ephemeris, which are specifically but not limited to the following.

Determination manner 1: the terminal device obtains the transmitting period of the SIB carrying the ephemeris from a master indication block (MIB).

In some embodiments, assuming that the SIB carrying the ephemeris is carried in the SIB 1, in the embodiments of the present disclosure, the transmitting period of the SIB carrying the ephemeris may be directly obtained from the MIB.

Determination manner 2: the terminal device obtains the transmitting period of the SIB carrying the ephemeris from an SIB1.

In some embodiments, assuming that the SIB carrying the ephemeris adopts a newly set SIB, in the embodiments of the present disclosure, the transmitting period of the SIB carrying the ephemeris may be obtained from other existing SIBs, for example, the transmitting period of the SIB carrying the ephemeris is obtained from an SIB1.

As an optional manner of the embodiments of the present disclosure, the configuration information of NPRACH transmission resources in the embodiments of the present disclosure may be obtained from the SIB2.

S301, the terminal device randomly selects one NPRACH transmission resource from the N NPRACH transmission resources.

S302, the terminal device performs the random access to the network device through the selected NPRACH transmission resource.

By using the resource allocation method in the embodiments of the present disclosure, since multiple available NPRACH occasions are incorporated, the terminal may randomly select one from the multiple available NPRACH occasions to be used for transmitting the preamble signal, so that at least one terminal that is randomly accessed can be distributed to different NPRACH transmitting occasions when performing the random access and the probability of collision is reduced, and therefore the problem of random access failure due to NPRACH transmitting collisions caused by the terminals concentrate on the same NPRACH occasion to initiate random accesses can be effectively avoided.

In an optional manner of the embodiments of the present disclosure, the configuration information of the NPRACH transmission resources may include the following content.

(1) NPRACH time domain resource configuration.
NPRACH resource period $$N_{period}^{NPRACH}$$

(nprach-Periodicity):
{40, 80, 160, 240, 320, 640, 1280, 2560} ms;
NPRACH start time $$N_{start}^{NPRACH}$$

(nprach-StartTime):
{8, 16, 32, 64, 128, 256, 512, 1024} ms;
a start time point of the NPRACH transmission is a time point of $$N_{start}^{NPRACH}$$

ms after a start point of a radio frame that meets $$n_f \bmod \left( \frac{N_{period}^{NPRACH}}{10} \right) = 0.$$

(2) NPRACH frequency domain resource configuration.
The first subcarrier frequency domain position $$N_{scoffset}^{NPRACH}(nprach - SubcarrierOffset) : -\{0, 12, 24, 36, 2, 18, 34\};$$

the quantity of subcarriers $$N_{sc}^{NPRACH}(nprach - NumSubcarriers) : -\{12, 24, 36, 48\};$$

the quantity of start subcarriers allocated to contention-based random access of NPRACH $$N_{sc_{cont}}^{NPRACH}(nprach - NumCBRA - StartSubcarriers) :$$

$$-\{8, 10, 11, 12, 20, 22, 23, 24, 32, 34, 35, 36, 40, 44, 46, 48\};$$

calculating the fraction of NPRACH subcarrier ranges reserved for UEs to indicate support for multi-tone msg 3:

$$N_{MSG3}^{NPRACH}(nprach - SubcarrierMSG3 - RangeStart); -\{0, 1/3, 2/3, 1\}.$$

The frequency domain position of the $i^{th}$ symbol group is determined by $$n_{sc}^{RA}(i) = n_{start} + \tilde{n}_{sc}^{RA}(i).$$

Where, $$n_{start} = N_{scoffset}^{NPRACH} + \left\lfloor \frac{n_{init}}{N_{sc}^{RA}} \right\rfloor * N_{sc}^{RA},$$

$$\tilde{n}_{sc}^{RA}(i) =$$

$$\begin{cases} \left(\tilde{n}_{sc}^{RA}(0) + f(i/4)\right) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n)2^{n-(10t+1)} \right) \bmod \left(N_{sc}^{RA} - 1\right) + 1 \right) \bmod N_{sc}^{RA}$$

$$f(-1) = 0$$

$$\tilde{n}_{sc}^{RA}(0) = n_{init} \bmod N_{sc}^{RA}, n_{init}$$

is a subcarrier selected from $$\{0, 1, \dots, N_{sc}^{NPRACH} - 1\}$$

by a medium access control (MAC) layer.

(3) Repetition times
NPRACH repetition times $$N_{period}^{NPRACH}$$

$$N_{rep}^{NPRACH} (numRepetitionsPerPreambleAttempt)$$

$$: \{1, 2, 4, 8, 16, 32, 64, 128\}.$$

In order to better determine the NPRACH transmission resources in the transmitting period of the SIBx, the embodiments of the present disclosure may be divided into multiple manners based on whether the time duration corresponding to the radio frame on which the terminal device is located can be divisible, which are not limited to the following several cases.

Case 1: the radio frame where the terminal device is located is an integer multiple of the configuration period of the NPRACH transmission resources.

In some embodiments, the terminal device determines N NPRACH transmission resources in the transmitting period of the SIB carrying the ephemeris according to the transmitting period of the SIB carrying the ephemeris, a first processing time, and a configuration period of the NPRACH transmission resources, where the first processing time is a period of time for the terminal device to read and/or decode and parse the SIB carrying the ephemeris.

Further, for the above case 1, the embodiments of the present disclosure provide the following Formula 1 to determine N NPRACH transmission resources corresponding to the transmitting period of the SIB carrying the ephemeris:

$$N_{num}^{NPRACH} = \lfloor (N_{period}^{SIBx} - T_{SIBx})/N_{period}^{NPRACH} \rfloor;$$    Formula 1

Where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

It should be noted that the Formula 1 in the present disclosure is only used for illustration, and does not constitute a limitation to the embodiments of the present disclosure. Any solution for determining the NPRACH transmission resource in the transmitting period of the first SIB obtained based on a modification of the Formula 1 in the present disclosure falls within the scope claimed in the embodiments of the present disclosure.

In an optional manner in the embodiments of the present disclosure, the configuration period of the NPRACH transmission resources is as follows:
{40, 80, 160, 240, 320, 640, 1280, 2560} ms.

Case 2: the radio frame where the terminal device is located is not an integer multiple of the configuration period of the NPRACH transmission resources.

In some embodiments, the terminal device determines N NPRACH transmission resources corresponding to the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

Further, for the above case 2, the embodiments of the present disclosure provide the following Formula 2 to determine N NPRACH transmission resources corresponding to the transmitting period of the SIB carrying the ephemeris:

$$N_{num}^{NPRACH} =$$    Formula 2

$$\lfloor (N_{period}^{SIBx} - T_{SIBx} - (n_f * 10 - (n_f * 10) \bmod N_{period}^{NPRACH}))/N_{period}^{NPRACH} \rfloor;$$

Where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

It should be noted that the Formula 2 in the present disclosure is only used for illustration, and does not constitute a limitation to the embodiments of the present disclosure. Any solution for determining the NPRACH transmission resource in the transmitting period of the first SIB obtained based on a modification of the Formula 2 in the present disclosure falls within the scope claimed in the embodiments of the present disclosure.

Further, in the embodiments of the present disclosure, there are multiple manners for the terminal device to randomly select one NPRACH transmission resource from the N NPRACH transmission resources, which are not limited to the following several manners.

Selection manner 1: one NPRACH transmission resource is selected directly and randomly from the N NPRACH transmission resources.

In an optional manner of the embodiments of the present disclosure, for the above-mentioned selection manner 1, the following Formula 3 is provided for selection:

$$n_f^{NPRACH} = n_f + rand(0, \ldots N_{num}^{NPRACH} - 1) * N_{period}^{NPRACH}/10; \qquad \text{Formula 3}$$

Where, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

It should be noted that the Formula 3 in the present disclosure is only used for illustration, and does not constitute a limitation to the embodiments of the present disclosure. Any solution for selecting the NPRACH transmission resource based on a modification of the Formula 3 in the present disclosure falls within the scope claimed in the embodiments of the present disclosure.

Selection manner 2: the terminal device randomly selects one NPRACH transmission resource from M NPRACH transmission resources; where M is a natural number greater than 0, and M is less than or equal to N.

In some embodiments, it is assumed that the terminal device determines that a total of 5 NPRACH transmission resources, which are NPRACH transmission resources 1 to 5 respectively, corresponding to the transmitting period of the SIB carrying the ephemeris. Then, the terminal device randomly selects from NPRACH transmission resources 2 to 4 in the NPRACH transmission resources 1 to 5.

In an optional manner of the embodiments of the present disclosure, the M is configured by the network device and notified to the terminal device.

In an optional manner of the embodiments of the present disclosure, the M is configured by the network device and notified to the terminal device through the message NB-SIB2 message.

In an optional manner of the embodiments of the present disclosure, the message NB-SIB2 may include identifiers of the M NPRACH transmission resources, or positions of the M NPRACH transmission resources, or other information, so as to be used by the terminal device to determine the M NPRACH transmission resources.

In an optional manner of the embodiments of the present disclosure, for the above-mentioned selection manner 2, the following Formula 4 is provided for selection:

$$n_f^{NPRACH} = n_f + rand(0, \ldots N_{num}^{RO} - 1) * N_{period}^{NPRACH}/10; \qquad \text{Formula 4}$$

$$N_{num}^{RO} \leq N_{num}^{NPRACH};$$

Where, $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

It should be noted that the Formula 4 in the present disclosure is only used for illustration, and does not constitute a limitation to the embodiments of the present disclosure. Any solution for selecting the NPRACH transmission resource based on a modification of Formula 4 in the present disclosure falls within the scope claimed in the embodiments of the present disclosure.

Further, in the embodiments of the present disclosure, when the terminal device performs the random access to the network device through the selected NPRACH transmission resource, certain conditions need to be met, that is, the terminal device performs the random access to the network device at the start time of the selected NPRACH transmission resource.

In some embodiments, the start time $$N_{start}^{NPRACH}$$

of the NPRACH transmission resource is as follows:

{8, 16, 32, 64, 128, 256, 512, 1024} ms.

Where, the start time point of the NPRACH transmission resource is a time point of $$N_{start}^{NPRACH}$$

ms after a start point of a radio frame that meets $$n_f \bmod \left( \frac{N_{period}^{NPRACH}}{10} \right) = 0.$$

Below, in order to better understand the resource allocation method in the present disclosure, the following embodiments are provided for introduction.

Figure 4:
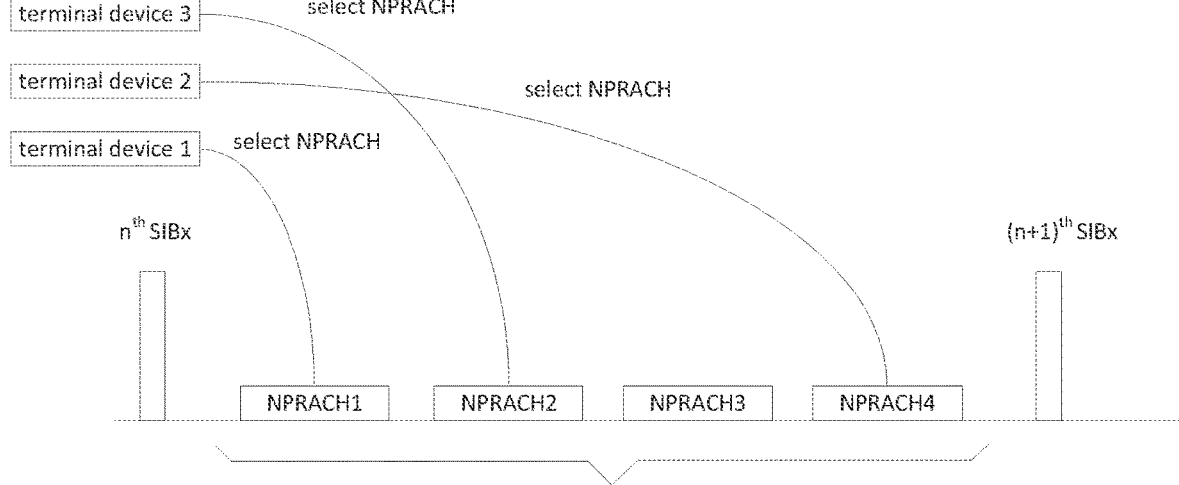
FIG. 4 is a schematic diagram of a first resource allocation scenario provided by an embodiment of the present disclosure.

As shown in FIG. 4, it is assumed that 4 NPRACH resources are in the transmitting period of the SIBx, and all of them are available.

Where, terminal devices 1 to 3 perform random accesses at the same time. By using the resource allocation method in the embodiments of the present disclosure, it is assumed that the terminal device 1 selects the NPRACH resource 1 when performing the random access, the terminal device 2 selects the NPRACH resource 4 when performing the random access, and the terminal device 3 selects the NPRACH resource 2 when performing the random access.

Figure 5:
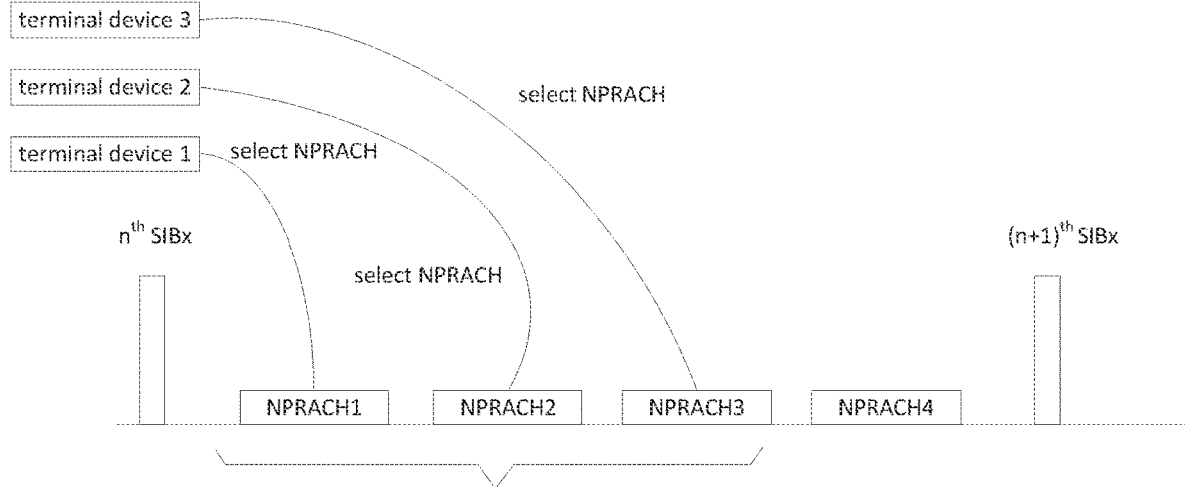
FIG. 5 is a schematic diagram of a second resource allocation scenario provided by an embodiment of the present disclosure.

As shown in FIG. 5, it is assumed that 4 NPRACH resources are in the transmitting period of the SIBx, and the network device indicates the terminal device that only NPRACH resources 1 to 3 are available.

Where, terminal devices 1 to 3 perform random accesses at the same time. By using the resource allocation method in the embodiments of the present disclosure, it is assumed that the terminal device 1 selects the NPRACH resource 1 when performing the random access, the terminal device 2 selects the NPRACH resource 3 when performing the random access, and the terminal device 3 selects the NPRACH resource 2 when performing the random access.

Therefore, from the contents shown in FIG. 4 and FIG. 5, it can be seen that, by using the solutions in the embodiments of the present disclosure, resources can be distributed effectively, and therefore the problem of random access failure can be effectively avoided due to NPRACH transmitting collisions caused by the terminals initiating random accesses on the same NPRACH occasion.

Figure 6:
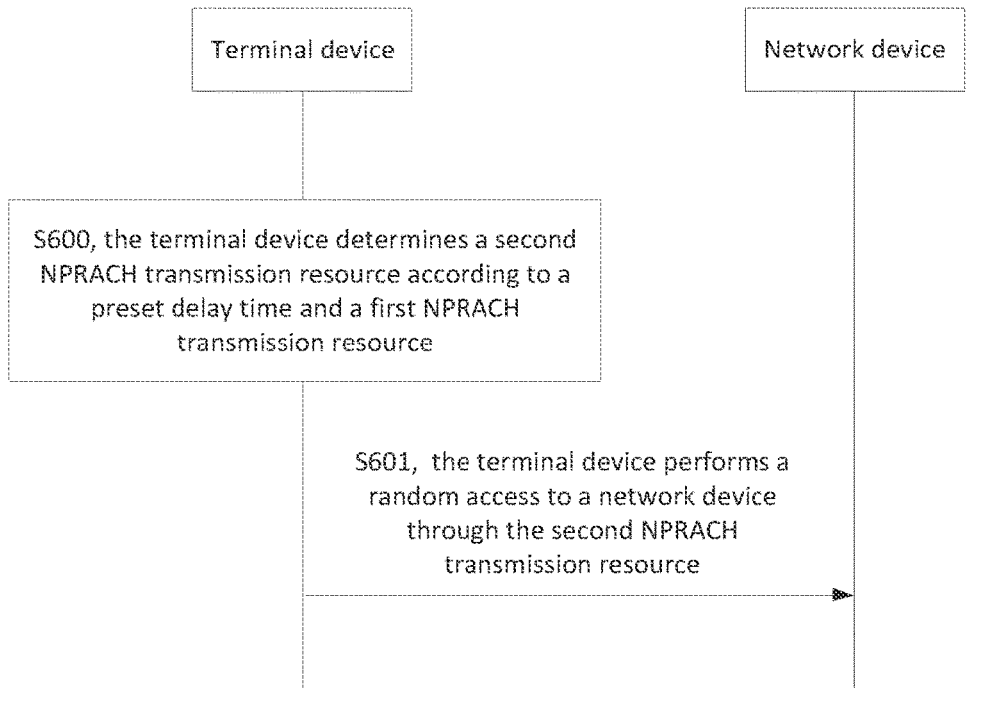
FIG. 6 is a schematic flowchart of a second resource allocation method provided by an embodiment of the present disclosure.

Further, as shown in FIG. 6, the embodiments of the present disclosure provide a resource allocation method, including the following.

S600, the terminal device determines a second NPRACH transmission resource, according to a preset delay time and a first NPRACH transmission resource.

In the embodiments of the present disclosure, the terminal device may determine the first NPRACH transmission resource by using the above-mentioned existing manner.

The preset delay time may be set by the terminal device itself, or a delay time randomly designated by the network device.

In an optional manner of the embodiments of the present disclosure, the delay time may be a time randomly selected.

S601, the terminal device performs a random access to a network device through the second NPRACH transmission resource.

Where, the second NPRACH transmission resource in the embodiments of the present disclosure is one of N NPRACH transmission resources corresponding to a transmitting period and determined by the terminal device according to the transmitting period of the SIB carrying the ephemeris and configuration information of NPRACH transmission resources notified in an SIB2, where N is a natural number greater than 0.

For the sake of brevity, for details of how to determine the N NPRACH transmission resources in the embodiments of the present disclosure, reference may be made to the content of FIG. 3 above, which will not be repeated here.

From the above introduction to the solutions of the present disclosure, it can be understood that, in order to realize the above functions, the above implementing devices include corresponding hardware structures and/or software devices for executing each function. The present disclosure can be implemented in hardware or a combination of hardware and computer software in conjunction with the devices and algorithm steps of each example in the embodiments disclosed herein. Whether a function is performed by hardware or computer software driving hardware depends on the specific application and design constraints of the embodiments. The described functionality using different methods for each particular application, but such implementations should not be considered beyond the scope of the present disclosure.

Figure 7:
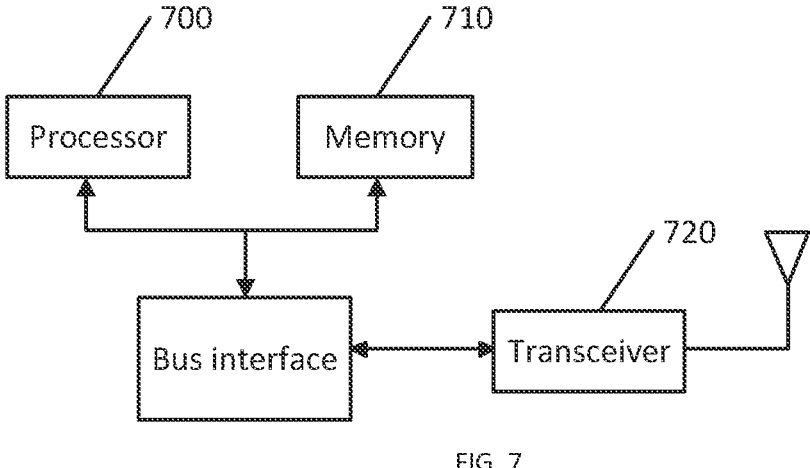
FIG. 7 is a schematic structural diagram of a first resource allocation device provided by an embodiment of the present disclosure.

As shown in FIG. 7, a resource allocation device according to the embodiments of the present disclosure includes a processor 700, a memory 701, and a transceiver 702.

The processor 700 is responsible for managing the bus architecture and general processing, and the memory 701 may store data used by the processor 700 in performing operations. The transceiver 702 is used to receive and transmit data under the control of the processor 700.

The bus architecture may include any number of interconnected buses and bridges, in particular one or more processors represented by the processor 700 and various circuits of the memory represented by the memory 701 link together. The bus architecture may also link together various other circuits, such as a peripheral, a voltage regulator, and a power management circuit, which are well known in the art, and therefore will not be described further herein. The bus interface provides the interface. The processor 700 is responsible for managing the bus architecture and general processing, and the memory 701 may store data used by the processor 700 in performing operations.

The processes disclosed in the embodiments of the present disclosure may be applied to the processor 700 or implemented by the processor 700. In the implementation process, each step of the signal processing flow may be completed by hardware integrated logic circuits or instructions in the form of software in the processor 700. The processor 700 may be a general-purpose processor, a digital signal processor, an application specific integrated circuit, a field programmable gate array or other programmable logic device, a discrete gate or transistor logic device, or a discrete hardware component, and may implement or execute methods, steps, and logical block diagrams disclosed in the embodiments of the present disclosure. A general purpose processor may be a microprocessor or any conventional processor or the like. The steps in conjunction with the methods disclosed in the embodiments of the present disclosure may be directly embodied as executed by a hardware processor, or executed by a combination of hardware and software devices in the processor. The software devices may be located in a random access memory, a flash memory, a read-only memory, a programmable read-only memory or an electrically erasable programmable memory, a register or other storage medium in the art. The storage medium is located in the memory 701, and the processor 700 reads the information in the memory 701 and completes the steps of the signal processing flow in combination with its hardware.

In an optional situation of the embodiments of the present disclosure, when the communication transmission device is a terminal user plane entity, the processor 700 is configured to read the program in the memory 701 to:

determine N NPRACH transmission resources in a transmitting period of an SIB carrying the ephemeris according to the transmitting period of the SIB carrying the ephemeris and a configuration information of NPRACH transmission resources, where N is a natural number greater than 0; randomly select one NPRACH transmission resource from the N NPRACH transmission resources; and perform a random access to a network device through the selected NPRACH transmission resource.

In a possible implementation, the processor is configured to:

determine N NPRACH transmission resources in the transmitting period of the SIB carrying the ephemeris according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx})/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processor is configured to:

determine N NPRACH transmission resources in the transmitting period of the SIB carrying the ephemeris according to the transmitting period of the SIB carrying the ephemeris, a first processing time, a configuration period of NPRACH transmission resources, and the radio frame;

where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} =$$

$$\lfloor (N_{period}^{SIBx} - T_{SIBx} - (n_f * 10 - (n_f * 10) \bmod N_{period}^{NPRACH}))/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In a possible implementation, one NPRACH transmission resource is randomly selected from the N NPRACH transmission resources by the following formula:

$$n_f^{NPRACH} = n_f + rand(0, \ldots N_{num}^{NPRACH} - 1) * N_{period}^{PRACH}/10;$$

where, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the processor is configured to:

randomly select one NPRACH transmission resource from M NPRACH transmission resources; where the M is a natural number greater than 0, and is less than or equal to N.

In a possible implementation, the M is configured by the network device and notified to the terminal device.

In a possible implementation, the M is configured by the network device and notified to the terminal device through the SIB2.

In a possible implementation, one NPRACH transmission resource is randomly selected from the M NPRACH transmission resources by the following formula:

$$n_f^{NPRACH}$$

where $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the processor is configured to:

perform the random access to the network device at a start time of the selected NPRACH transmission resource.

In another optional situation of the embodiments of the present disclosure, when the communication transmission device is a terminal user plane entity, the processor 700 is configured to read the programs in the memory 701 to:

determine, according to a preset delay time and a first NPRACH transmission resource, a second NPRACH transmission resource; and perform a random access to a network device through the second NPRACH transmission resource.

In a possible implementation, the second NPRACH transmission resource is one of N NPRACH transmission resources corresponding to a transmitting period of an SIB carrying an ephemeris and determined by the terminal device according to the transmitting period of the SIB carrying the ephemeris and configuration information of NPRACH transmission resources notified in an SIB2, where N is a natural number greater than 0.

In a possible implementation, the processor is configured to:

determine N NPRACH transmission resources in the transmitting period of the SIB carrying the ephemeris according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx})/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processor is configured to:

determine N NPRACH transmission resources corresponding to the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} =$$

$$\lfloor (N_{period}^{SIBx} - T_{SIBx} - (n_f * 10 - (n_f * 10) \bmod N_{period}^{NPRACH}))/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

Figure 8:
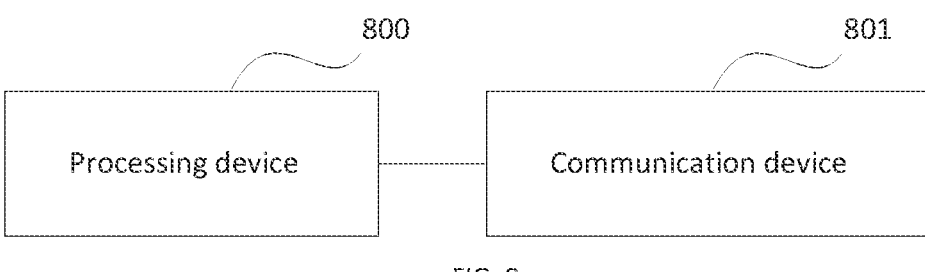
FIG. 8 is a schematic structural diagram of a second resource allocation device provided by an embodiment of the present disclosure.

As shown in FIG. 8, the present disclosure provides a resource allocation device, which includes:

a processing device 800, configured to determine N NPRACH transmission resources corresponding to a transmitting period of an SIB carrying an ephemeris according to the transmitting period of the SIB carrying the ephemeris and configuration information of NPRACH transmission resources notified in an SIB2, where N is a natural number greater than 0; and randomly select one NPRACH transmission resource from the N NPRACH transmission resources; and a communication device 801, configured to perform a random access to a network device through the selected NPRACH transmission resource.

In a possible implementation, N NPRACH transmission resources in the transmitting period of the SIB carrying the ephemeris are determined according to the transmitting period of the SIB carrying the ephemeris, a first processing time, and a configuration period of the NPRACH transmission resources; where the first processing time is a period of time for a terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx})/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processing device 800 is configured to:

determine N NPRACH transmission resources in the transmitting period of the SIB carrying the ephemeris according to the transmitting period of the SIB carrying the ephemeris, a first processing time, a configuration period of NPRACH transmission resources, and a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} = \lfloor (N_{period}^{SIBx} - T_{SIBx} - (n_f*10 - (n_f*10)\bmod N_{period}^{NPACH}))/N_{period}^{NPACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In a possible implementation, one NPRACH transmission resource is randomly selected from the N NPRACH transmission resources by the following formula:

$$n_f^{NPRACH} = n_f + rand(0, ... N_{num}^{NPRACH} - 1)*N_{period}^{PRACH}/10;$$

where, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

In a possible implementation, the processing device 800 is configured to:

randomly select one NPRACH transmission resource from M NPRACH transmission resources; where the M is a natural number greater than 0, and is less than or equal to N.

In a possible implementation, the M is configured by the network device and notified to the terminal device.

In a possible implementation, the M is configured by the network device and notified to the terminal device through the SIB2.

In a possible implementation, one NPRACH transmission resource is randomly selected from the M NPRACH transmission resources by the following formula:

$$n_f^{NPRACH} = n_f + rand(0, \ldots N_{num}^{RO} - 1) * N_{period}^{PRACH}/10;$$

$$N_{num}^{RO} \leq N_{num}^{NPRACH};$$

where, $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource. n'f

In a possible implementation, the communication device 801 is configured to:

perform the random access to the network device at a start time of the selected NPRACH transmission resource.

Figure 9:
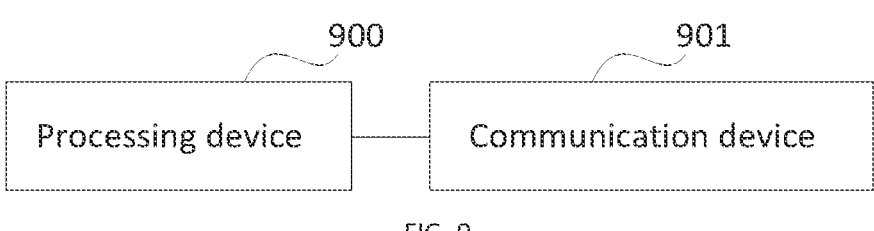
FIG. 9 is a schematic structural diagram of a second resource allocation device provided by an embodiment of the present disclosure.

As shown in FIG. 9, the present disclosure provides a resource allocation device, including:

a processing device 900, configured to determine, according to a preset delay time and a first NPRACH transmission resource, a second NPRACH transmission resource; and a communication device 901, configured to perform a random access to a network device through the second NPRACH transmission resource.

In a possible implementation, the second NPRACH transmission resource is one of N NPRACH transmission resources corresponding to a transmitting period of an SIB carrying an ephemeris and determined by a terminal device according to the transmitting period of the SIB carrying the ephemeris and configuration information of NPRACH transmission resources notified in an SIB2, where N is a natural number greater than 0.

In a possible implementation, the processing device 900 is configured to:

determine N NPRACH transmission resources in the transmitting period of the SIB carrying the ephemeris according to the transmitting period of the SIB carrying the ephemeris, a first processing time, and a configuration period of the NPRACH transmission resources; where the first processing time is a period of time for the terminal device to read and/or decode and parse the SIB carrying the ephemeris.

In a possible implementation, in a condition that a radio frame on which the terminal device is located is an integer multiple of the configuration period of the NPRACH transmission resources, the N NPRACH transmission resources are determined by the following formula:

$$N_{num}^{NPRACH} = \lfloor (N_{period}^{SIBx} - T_{SIBx})/N_{period}^{NPRACH} \rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

In a possible implementation, the processing device 900 is configured to:

determine N NPRACH transmission resources in the transmitting period of the SIB carrying the ephemeris according to the transmitting period of the SIB carrying the ephemeris, a first processing time, a configuration period of NPRACH transmission resources, and a time duration corresponding to a radio frame; where the first processing time is a period of time for the terminal device to read and/or decode and parse the SIB carrying the ephemeris.

In a possible implementation, in a condition that the radio frame on which the terminal device is located is not an integer multiple of the configuration period of the NPRACH transmission resource, the N NPRACH transmission resources are determined by the following formula:

$$N_{num}^{NPRACH} =$$

$$\left\lfloor \left( N_{period}^{SIBx} - T_{SIBx} - \left( n_f * 10 - (n_f * 10) \bmod N_{period}^{NPRACH} \right) \right) / N_{period}^{NPRACH} \right\rfloor;$$

where, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

In some possible implementations, various aspects of the resource allocation method provided by the embodiments of the present disclosure may also be implemented in the form of a program product, which includes program codes, and when the program codes run on a computer device, the program codes are used to cause the computer device to perform the steps in the resource allocation method according to various exemplary implementations of the present disclosure described in the specification.

The program product may employ one readable medium or any combination of more readable mediums. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage mediums include: an electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the foregoing.

A program product for resource configuration according to the embodiments of the present disclosure may employ a portable compact disk read only memory (CD-ROM) and include program codes, and may run on a server device. However, the program product of the present disclosure is not limited thereto, and herein, a readable storage medium may be any tangible medium that contains or stores a program that can be used by or in conjunction with an information transmission, apparatus, or element.

The readable signal medium may include a data signal, carrying readable program code therein, propagated in base-band or as part of a carrier wave. Such propagated data signal may take a variety of forms including, but not limited to, an electromagnetic signal, an optical signal, or any suitable combination of the foregoing. The readable signal medium can also be any readable medium, other than a readable storage medium, that can transmit, propagate, or transport a program used by or used in connection with a periodic network action system, apparatus, or element.

Program codes included in the readable medium may be transmitted using any suitable medium including, but not limited to, wireless, wired, an optical fiber cable, RF, etc., or any suitable combination of the foregoing.

Program codes for carrying out operations of the present disclosure may be written in any combination of one or more programming languages, including object-oriented programming languages, such as Java, C++, etc., as well as the conventional procedural programming language, such as the "C" language or the similar programming language. The program codes may be executed entirely on the user computing device, partly on the user device, as a stand-alone software package, partly on the user computing device and partly on the remote computing device, or entirely on the remote computing device or server. In the case of the remote computing device, the remote computing device may be connected to the user computing device through any kind of network, including a local area network (LAN) or a wide area network (WAN), or may be connected to an external computing device.

The embodiments of the present disclosure further provide a computing device readable storage medium for the resource allocation method on the terminal side, that is, the content is not lost after a power failure. The storage medium stores software programs, including program codes. When the program codes are run on a computing device, the software programs can implement any scheme for resource allocation method of the above embodiments of the present disclosure when read and executed by one or more processors.

In the above-mentioned embodiments of the present disclosure, in order to realize the functions in the methods provided by the above-mentioned embodiments of the present disclosure, the resource allocation device may include a hardware structure and/or a software device, and the above functions is achieved in the form of the hardware structure, the software device, or the hardware structure plus software device. One of the above functions is performed in the form of the hardware structure, the software device, or the hardware structure plus software device depends on the specific application and design constraints of the embodiments.

The present disclosure is described above with reference to block diagrams and/or flowchart illustrations illustrating methods, devices (systems) and/or computer program products according to the embodiments of the present disclosure. It should be understood that a block of the block diagrams and/or flowchart illustrations, and combinations of blocks of the block diagrams and/or flowchart illustrations, can be implemented by computer program instructions. These computer program instructions may be provided to processors of a general purpose computer, a special purpose computer and/or other programmable data processing apparatus to generate a machine, so that the instructions executed via the computer processor and/or other programmable data processing apparatus create a method used for implementing the functions/actions specified in the block diagrams and/or flowchart blocks.

Accordingly, the present disclosure may also be implemented in hardware and/or software (including firmware, resident software, microcode, etc.). Still further, the present disclosure may take the form of a computer program product on a computer usable or computer readable storage medium having computer usable or computer readable program codes embodied in the medium and used by an instruction execution system or used in conjunction with an instruction execution system. In the context of the present disclosure, a computer usable or computer readable medium can be any medium that can contain, store, communicate, transmit, or transmit a program used by or used in connection with the instruction execution system, apparatus, or element.

What is claimed is:

1. A resource allocation method, comprising:
determining, by a terminal device, N narrowband physical random access channel (NPRACH) transmission resources corresponding to a transmitting period of a system information block (SIB) carrying an ephemeris according to the transmitting period of the SIB carrying the ephemeris and configuration information of NPRACH transmission resources notified in an SIB2, wherein N is a natural number greater than 0;

randomly selecting, by the terminal device, one NPRACH transmission resource from the N NPRACH transmission resources; and performing, by the terminal device, a random access to a network device through the selected NPRACH transmission resource.

2. The method according to claim 1, wherein the determining, by the terminal device, the N NPRACH transmission resources corresponding to the transmitting period of the SIB carrying the ephemeris according to the transmitting period of the SIB carrying the ephemeris and the configuration information of NPRACH transmission resources notified in the SIB2, comprising:

determining, by the terminal device, the N NPRACH transmission resources corresponding to the transmitting period of the SIB carrying the ephemeris according to the transmitting period of the SIB carrying the ephemeris, a first processing time, and a configuration period of the NPRACH transmission resources;

wherein the first processing time is a period of time for the terminal device to read and/or decode and parse the SIB carrying the ephemeris; and wherein in a condition that a radio frame on which the terminal device is located is an integer multiple of the configuration period of the NPRACH transmission resources, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \lfloor (N_{period}^{SIBx} - T_{SIBx}) / N_{period}^{NPRACH} \rfloor;$$

wherein, $$N_{num}^{NPRACH}$$

represents a quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents ure conngurauon period of the NPRACH transmission resources.

3. The method according to claim 1, wherein the determining, by the terminal device, the N NPRACH transmission resources corresponding to the transmitting period of the SIB carrying the ephemeris according to the transmitting period of the SIB carrying the ephemeris and the configuration information of NPRACH transmission resources notified in the SIB2, comprising:

determining, by the terminal device, the N NPRACH transmission resources corresponding to the transmitting period of the SIB carrying the ephemeris according to the transmitting period of the SIB carrying the ephemeris, a first processing time, a configuration period of NPRACH transmission resources, and a radio frame;

wherein the first processing time is a period of time for the terminal device to read and/or decode and parse the SIB carrying the ephemeris; and wherein in a condition that the radio frame on which the terminal device is located is not an integer multiple of the configuration period of the NPRACH transmission resource, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} =$$
$$\lfloor (N_{period}^{SIBx} - T_{SIBx} - (n_f * 10 - (n_f * 10) \bmod N_{period}^{NPRACH})) / N_{period}^{NPRACH} \rfloor;$$

wherein, $$N_{num}^{NPRACH}$$

represents the quanity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

4. The method according to claim 1, wherein a formula for the terminal device randomly selecting one NPRACH transmission resource from the N NPRACH transmission resources is:

$$n_f^{NPRACH} = n_f + r \text{ and } \left(0, \ldots N_{num}^{NPRACH} - 1\right) * \frac{N_{period}^{PRACH}}{10};$$

wherein, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

5. The method according to claim 1, wherein the randomly selecting, by the terminal device, one NPRACH transmission resource from the N NPRACH transmission resources, comprising:

randomly selecting, by the terminal device, one NPRACH transmission resource from M NPRACH transmission resources;

wherein the M is a natural number greater than 0, and is less than or equal to N;

wherein the M is configured by the network device and notified to the terminal device; and wherein the M is configured by the network device and notified to the terminal device through the SIB2.

6. The method according to claim 5, wherein a formula for the terminal device randomly selecting one NPRACH transmission resource from the M NPRACH transmission resources is:

$$n_f^{NPRACH} = n_f + r \text{ and } \left(0, \ldots N_{num}^{RO} - 1\right) * \frac{N_{period}^{PRACH}}{10};$$

$$N_{num}^{RO} \leq N_{num}^{NPRACH};$$

wherein $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents une configuration period of the NPRACH transmission resources, and $$n_f^{NPRACH}$$

represents the randomly selected NPRACH transmission resource.

7. The method according to claim 1, wherein the performing, by the terminal device, the random access to the network device through the selected NPRACH transmission resource, comprising:

performing, by the terminal device, the random access to the network device at a start time of the selected NPRACH transmission resource.

8. A non-transitory computer storage medium, storing a computer program thereon, wherein when the program is executed by a processor, the method according claim 1 is implemented.

9. A resource allocation method, comprising:

determining, by a terminal device, N narrowband physical random access channel (NPRACH) transmission resources corresponding to a transmitting period of a system information block (SIB) carrying an ephemeris according to the transmitting period of the SIB carrying the ephemeris and configuration information of NPRACH transmission resources notified in an SIB2, wherein N is a natural number greater than 0;

determining, by the terminal device, according to a preset delay time and a first NPRACH transmission resource, a second NPRACH transmission resource from the N NPRACH transmission resources; and performing, by the terminal device, a random access to a network device through the second NPRACH transmission resource.

10. The method according to claim 9, wherein determining, by the terminal device, N NPRACH transmission resources corresponding to the transmitting period of the SIB carrying the ephemeris according to the transmitting period of the SIB carrying the ephemeris and the configuration information of NPRACH transmission resources notified in the SIB2, comprising determining, by the terminal device, the N NPRACH transmission resources corresponding to the transmitting period of the SIB carrying the ephemeris according to the transmitting period of the SIB carrying the ephemeris, a first processing time, and a configuration period of the NPRACH transmission resources;

wherein the first processing time is a period of time for the terminal device to read and/or decode and parse the SIB carrying the ephemeris; and wherein in a condition that a radio frame on which the terminal device is located is an integer multiple of the configuration period of the NPRACH transmission resources, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \left\lfloor \left( N_{period}^{SIBx} - T_{SIBx} \right) / N_{period}^{NPRACH} \right\rfloor;$$

wherein, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configurauon period of the NPRACH transmission resources.

11. The method according to claim 9, wherein the determining, by the terminal device, the N NPRACH transmission resources corresponding to the transmitting period of the SIB carrying the ephemeris according to the transmitting period of the SIB carrying the ephemeris and the configuration information of NPRACH transmission resources notified in the SIB2, comprising:

determining, by the terminal device, the N NPRACH transmission resources corresponding to the transmitting period of the SIB carrying the ephemeris according to the transmitting period of the SIB carrying the ephemeris, a first processing time, a configuration period of NPRACH transmission resources, and a radio frame;

wherein the first processing time is a period of time for the terminal device to read and/or decode and parse the SIB carrying the ephemeris; and, wherein in a condition that the radio frame on which the terminal device is located is not an integer multiple of the configuration period of the NPRACH transmission resource, a formula for the terminal device determining the N NPRACH transmission resources corresponding to the transmitting period of the SIB carrying the ephemeris according to the transmitting period of the SIB carrying the ephemeris and the configuration information of NPRACH transmission resources notified in the SIB2 is:

$$N_{num}^{NPRACH} = \left\lfloor \left( N_{period}^{SIBx} - T_{SIBx} - \left( n_f * 10(n_f * 10) \bmod N_{period}^{NPRACH} \right) \right) / N_{period}^{NPRACH} \right\rfloor;$$

wherein, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f*10$ represents a time duration corresponding to the radio frame of $n_f$, and $$N_{period}^{NPRACH}$$

represents the configuration period of the NPRACH transmission resources.

12. A resource allocation device, comprising: a processor, a memory, and a transceiver;

wherein the processor is configured to read the program in the memory to execute the method of claim 9.

13. A resource allocation device, comprising: a processor, a memory, and a transceiver;

wherein the processor is configured to read programs in the memory to:

determine N narrowband physical random access channel (NPRACH) transmission resources corresponding to a transmitting period of a system information block (SIB) carrying an ephemeris according to the transmitting period of the SIB carrying the ephemeris and configuration information of NPRACH transmission resources notified in an SIB2, wherein N is a natural number greater than 0;

randomly select one NPRACH transmission resource from the N NPRACH transmission resources; and perform a random access to a network device through the selected NPRACH transmission resource.

14. The device of claim 13, wherein the processor is configured to:

determine the N NPRACH transmission resources corresponding to the transmitting period of the SIB carrying the ephemeris according to the transmitting period of the SIB carrying the ephemeris, a first processing time, and a configuration period of the NPRACH transmission resources; wherein the first processing time is a period of time for the terminal device to read and/or decode and parse the SIB carrying the ephemeris; and, wherein in a condition that a radio frame on which the terminal device is located is an integer multiple of the configuration period of the NPRACH transmission resources, the N NPRACH transmission resources are determined by a following formula:

$$N_{num}^{NPRACH} = \lfloor (N_{period}^{SIBx} - T_{SIBx})/N_{period}^{NPRACH} \rfloor;$$

wherein, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, and $$N_{period}^{NPRACH}$$

represents the configuration period of the NPRACH transmission resources.

15. The device according to claim 13, wherein the processor is configured to:

determine the N NPRACH transmission resources corresponding to the transmitting period of the SIB carrying the ephemeris according to the transmitting period of the SIB carrying the ephemeris, a first processing time, a configuration period of NPRACH transmission resources, and a radio frame; wherein the first processing time is a period of time for the terminal device to read and/or decode and parse the SIB carrying the ephemeris; and, wherein in a condition that the radio frame on which the terminal device is located is not an integer multiple of the configuration period of the NPRACH transmission resource, the N NPRACH transmission resources are determined by a following formula:

$$N_{num}^{NPRACH} = \lfloor (N_{period}^{SIBx} - T_{SIBx} - (n_f * 10(n_f * 10) \bmod N_{period}^{NPRACH}))/N_{period}^{NPRACH} \rfloor;$$

wherein, $$N_{num}^{NPRACH}$$

represents the quantity N of NPRACH transmission resources, $$N_{period}^{SIBx}$$

represents the transmitting period of the SIB carrying the ephemeris, $T_{SIBx}$ represents the first processing time, $n_f$ represents a sequence number of the radio frame, $n_f * 10$ represents a time duration corresponding to the radio frame of $n_f$, and $$N_{period}^{NPRACH}$$

represents the configuration period of the NPRACH transmission resources.

16. The device according to claim 13, wherein one NPRACH transmission resource is randomly selected from the N NPRACH transmission resources by a following formula:

$$n_f^{NPRACH} = n_f + r \text{ and } (0, \dots N_{num}^{NPRACH} - 1) * \frac{N_{period}^{PRACH}}{10};$$

wherein, $$N_{num}^{NPRACH}$$

represents the quantity N of NPRACH transmission resources, $n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

17. The device according to claim 13, wherein the processor is configured to:

randomly select one NPRACH transmission resource from M NPRACH transmission resources;

wherein the M is a natural number greater than 0, and is less than or equal to N;

wherein the M is configured by the network device and notified to the terminal device; and, wherein the M is configured by the network device and notified to the terminal device through the SIB2.

18. The device according to claim 17, wherein one NPRACH transmission resource is randomly selected from the M NPRACH transmission resources by a following formula:

$$n_f^{NPRACH} = n_f + r \text{ and } (0, \dots N_{num}^{RO} - 1) * \frac{N_{period}^{PRACH}}{10};$$

$$N_{num}^{RO} \le N_{num}^{NPRACH};$$

wherein $$N_{num}^{RO}$$

represents NPRACH transmission resources indicated by the network device, and a value of which is 0, . . .

$$N_{num}^{NPRACH} - 1,$$

$n_f$ represents a sequence number of a radio frame, $$N_{period}^{NPRACH}$$

represents the configuration period of the NPRACH transmission resources, and $$n_f^{NPRACH}$$

represents the randomly selected NPRACH transmission resource.

19. The device according to claim 13, wherein the processor is configured to:

perform the random access to the network device at a start time of the selected NPRACH transmission resource.

* * * * *